Aug. 22, 1950     P. C. GARDINER     2,519,898

DEPTH MEASURING EQUIPMENT

Filed July 27, 1949

Inventor:
Paul C. Gardiner,
by Merton D Morse
His Attorney.

Patented Aug. 22, 1950

2,519,898

UNITED STATES PATENT OFFICE 2,519,898

DEPTH MEASURING EQUIPMENT

Paul C. Gardiner, Scotia, N. Y., assignor to General Electric Company, a corporation of New York Application July 27, 1949, Serial No. 107,103

1 Claim. (Cl. 177—386)

This invention relates generally to pulse-echo systems, and more particularly to a simplified range or depth indicating circuit for use with an under-water ranging system.

Under-water ranging equipment presently in use operates on the principle of transmitting a pulse or train of supersonic wave energy, receiving an echo of this pulse, and measuring the time interval between the transmission and the reception to indicate the range of the reflecting object causing the echo. The accuracy of such a system of ranging is based on the assumption that the velocity of compressional waves in water is reasonably constant. In sea water, where the temperature remains fairly steady, this assumption is justified and a fair measure of accuracy is obtainable. Under-water ranging equipment operating on this principle has been produced under various forms, such as depth sounders and submarine detectors.

Various types of indicating instruments are used for both presenting and recording range information. One well known instrument uses a mechanical stylus which sweeps across a moving roll of paper. The presence of an echo is recorded by a deflection in an ink line or by a change in the character of the line as it traces its normal pattern from one edge of the paper to the other.

My invention contemplates the use of a much simpler indicating instrument in the form of a meter to provide a simple indication of the distance from the closest reflecting object, to the ship carrying the under-water sound ranging equipment. Such an indicator can be constructed at a much lower cost than the more complex type of indicating equipment mentioned above. In its operation, there is provided a continuous indication of the depth of the bottom. The presence of an object in the water suspended intermediate the surface and the bottom, is indicated by a sudden decrease in the depth indication. While this may possibly lead to some confusion as to whether the indication is in fact caused by an object suspended in the water or by a true decrease in depth, with a little practice, an operator, partly basing his judgment on audible sound derived from the echoes, may readily differentiate between these possibilities. Thus, for instance, the presence of fish would be indicated by intermittent decreases in the depth indication, as well as by the sound of more than one echo per transmission period when both the fish and the bottom are sending back echoes.

Accordingly, it is an object of my invention to provide a simplified range indicating device for a pulse-echo system.

A further object of my invention is to provide a device giving a simple meter indication of the range of the closest reflecting object to a ship carrying under-water sound ranging equipment.

For further objects and advantages and for a better understanding of the invention, attention is now directed to the following description and accompanying drawings. The features of my invention, believed to be novel are more particularly pointed out in the appended claim.

Figure 1:
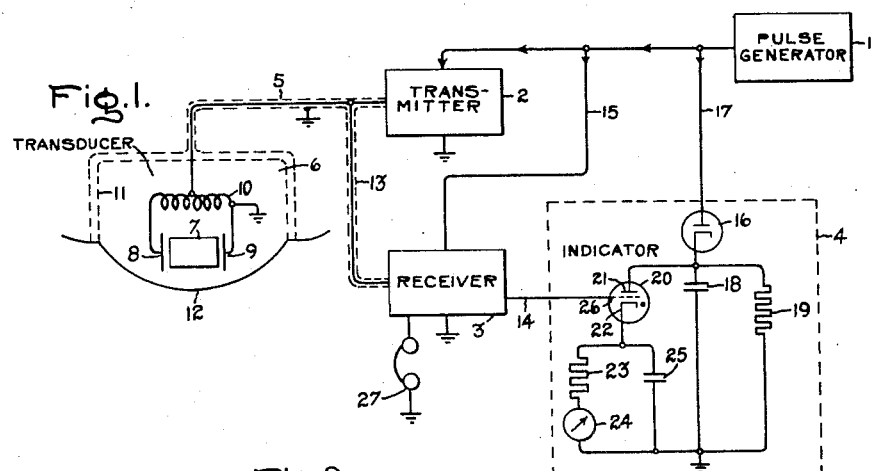
Fig. 1 is a schematic diagram, partially in block form, of an underwater sound ranging equipment embodying my invention.

Referring to Fig. 1, there is shown a pulse generator 1, which supplies a series of positive voltage pulses to a transmitter 2, a receiver 3, and an indicator 4. Transmitter 2 may consist of any one of the well known forms of electronic oscillators, such as, for instance, a Colpitts oscillator. It is designed to provide a series of electrical oscillations upon the reception of a voltage pulse from generator 1.

The electrical oscillations from transmitter 2 are supplied over a shielded cable 5, to a transducer 6, whose function is to translate the elecrical oscillations into supersonic compressional waves. These oscillations are usually at a slightly higher frequency than the upper limit of audible sound, for instance in the range from 25,000 to 50,000 cycles per second. Transducer 6 is provided with a quartz crystal 7 which is cut to oscillate at the same frequency as the transmitter 2. Crystal 7 is mounted between a pair of capacitor plates 8 and 9, which are connected to the end terminals of a coil 10. Cable 5 is connected to a tap point on coil 10, so as to permit a suitable impedance match between the output circuit of transmitter 2 and the input impedance of transducer 6. The operating parts of transducer 6 are contained within a housing 11, whose lower side is faced by a thin flexible diaphragm 12. In a practical application, transducer 6 is mounted in the hold of a ship in such a fashion that diaphragm 12 protrudes below the ship structure. The transducer is filled with distilled water or some other suitable liquid so that the trains of compressional waves generated therein by crystal 7 may propagate through diaphragm 12 into the sea.

Transducer 6 operates also as a pick-up device, and reconverts received echoes, resulting from reflections of the original transmitted waves, into electrical energy which is supplied through cable 13 to the input of receiver 3. Receiver 3 contains conventional electronic amplifying and detecting circuits, and supplies the received echoes as positive voltage pulses to the indicator 4, over a lead 14. It will be noted that receiver 3 is also supplied with the positive voltage pulses from generator 1 over a lead 15. The generator pulses are provided to receiver 3 for the purpose of inactivating it during the short time interval when transmitter 2 is providing electrical oscillations to transducer 6. Immediately thereafter, receiver 3 becomes active to amplify any echoes received by the transducer and supply them as positive voltage pulses to indicator 4.

Indicator 4 comprises a diode 16, which is connected in series with lead 17 to a charging circuit comprising a capacitor 18 and a resistor 19. In parallel with capacitor 18 there is connected a gaseous discharge tube 20 of the type having an anode, a cathode, and a control electrode, and which is commonly known as a thyratron. Its anode 21 is connected to the junction of diode 16 and capacitor 18, and its cathode 22 is connected, in series with a resistor 23 and a meter 24, to ground. A capacitor 25 is also connected between cathode 22 and ground. The control electrode 26 of thyratron tube 20 is connected by means of lead 14 to the receiver 3.

Figure 2:
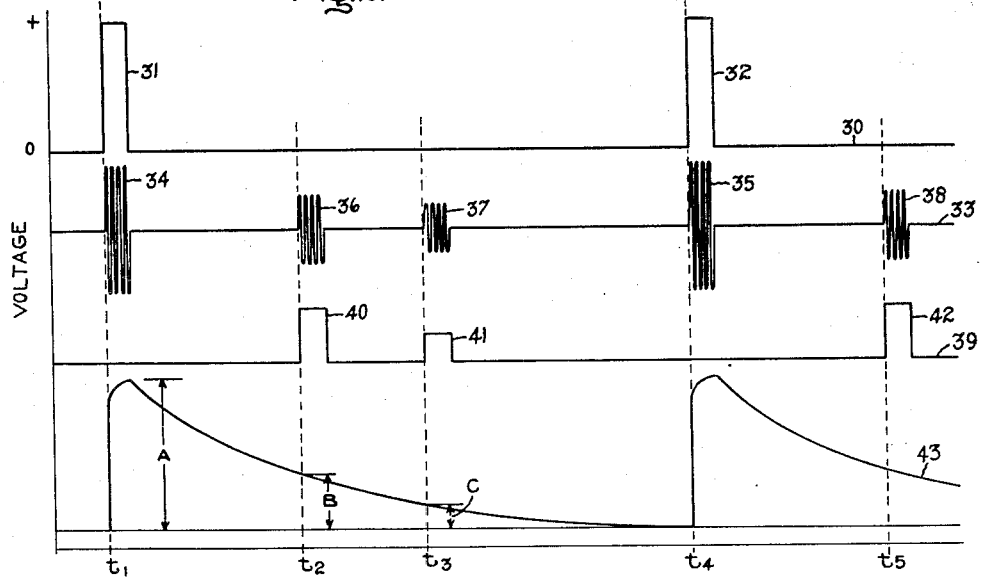
Fig. 2 shows a series of curves illustrating some of the operating characteristics of the system of Fig. 1.

In the operation of the system, pulse generator 1 provides positive pulses of voltage at suitable time intervals, depending on the maximum range or depth which the system is designed to measure. This is illustrated in Fig. 2 by curve 30, wherein the pulses 31 and 32, occurring at time $t_1$ and $t_4$ respectively, represent voltage pulses from generator 1. The time interval from $t_1$ to $t_4$ may, for instance, occupy one-half of a second. The voltage pulses from generator 1 cause transmitter 2 to produce oscillations such as are illustrated in curve 33 by sections 34 and 35 thereof. These electrical oscillations cause similar mechanical vibrations in the crystal 7 of transducer 6, which produce short trains of compressional waves in the water. The trains of wave energy in the water produce echoes from reflecting objects, such as for instance the bottom of the sea, or schools of fish. These wave echoes return to the transducer and are thereupon converted into electrical energy which is supplied to receiver 3. Receiver 3 amplifies and detects this energy and supplies it as positive voltage pulses to the indicator. The echoes received may, for instance, be represented by sections 36, 37 and 38 of curve 33, illustrating echoes occurring at times $t_2$, $t_3$, and $t_5$ respectively.

Pulse generator 1 also supplies receiver 3 with a positive voltage pulse at the same instant as this pulse is supplied to transmitter 2. This pulse temporarily inactivates the receiver during its occurrence, so that the receiver does not supply a positive signal to the indicator corresponding with the occurrence of the transmitted pulse. However, immediately thereafter the receiver becomes operative and any pulses resulting from echoes received by the transducer are supplied to the indicator. The signal supplied by the receiver to the indicator is illustrated by curve 39, wherein the pulses 40, 41, and 42 occurring at times $t_2$, $t_3$, and $t_5$ respectively, illustrate echoes received.

Pulse generator 1 also supplies to the indicator a positive pulse at the anode of diode 16. This causes capacitor 18 to charge positively to a value approximately equal to the maximum amplitude of the pulse. This is illustrated by curve 43 of Fig. 2, capacitor 18 having charged to an amplitude represented by A, immediately following times $t_1$ and $t_4$. Thyratron tube 20 is normally non-conducting so that capacitor 18 discharges slowly through resistor 19, following an exponential curve as illustrated by the sections from time $t_1$ to $t_4$ of curve 43. As soon as an echo is received from the transducer, receiver 3 supplies a positive pulse, such as is illustrated by 40, to the control electrode 26 of thyratron tube 20. Tube 20 thereupon fires and becomes conductive, immediately discharging capacitor 18 into capacitor 25. The magnitude of capacitor 25 is chosen considerably larger than that of capacitor 18, so that the discharge of capacitor 18 into capacitor 25 produces only a much smaller voltage thereacross. Since capacitor 18 is all the time discharging exponentially through resistor 19, it will be seen that the magnitude of the voltage to which capacitor 25 is charged, depends upon the instant of time at which the firing of tube 20 occurs. It is accordingly, possible to calibrate meter 24 to provide an indication of the time of firing of tube 20, which, naturally, is correlated with the range of a reflecting object in the water.

The circuit comprising resistor 23, in series with meter 24, causes capacitor 25 to discharge slowly all the time. In combination with capacitor 25, it provides an integrating action so that meter 24 gives a relatively steady reading which moves or varies comparatively slowly, in accordance with the range of the reflecting object which is closest to the ship.

A pair of earphones 27 may be connected to receiver 3 to enable the operator to listen for echoes so that he may be aware of multiple echoes occurring after the first one whose range is indicated by meter 24. Means for heterodyning the supersonic oscillations into audible sound frequencies are then provided in receiver 3.

In accordance with my invention, the first echo having an amplitude large enough to produce in receiver 3 a pulse sufficient to fire thyratron tube 20 in indicator 4 is the only one whose range is measured. Any other echoes, such as, for instance, the echo represented by 37 in curve 33, produce no effect on the reading of meter 24. However the operator may hear such echoes over the earphones and estimate range by mentally timing their occurrence. While this may be a limitation that would make my indicating system unsuitable for submarine detecting or other more elaborate services, it is actually of no importance in the simpler application for which it is designed. Thus my system is entirely suitable for providing the navigator aboard a ship with a continuous indication of the depth of the bottom. It is also entirely sufficient to provide him with an indication of the presence of objects intervening between the surface and the bottom, underneath his ship, or in the immediate vicinity.

Figure 3:
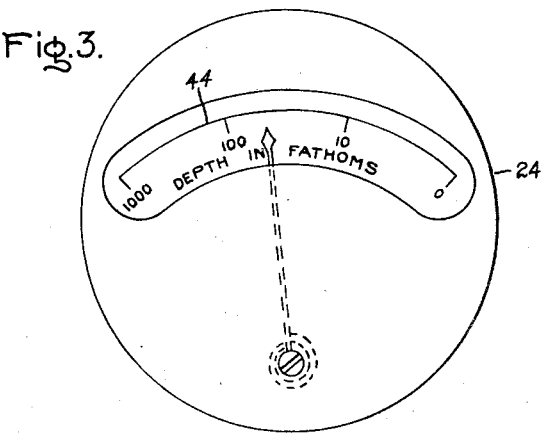
Fig. 3 illustrates the calibration of a meter utilized in conjunction with my invention to indicate range or depth.

My invention also has the advantage that it provides range indication on a semi-logarithmic scale, since capacitor 18 discharges exponentially with time. This is illustrated in Fig. 3 showing the face of meter 24 which is part of the indicator of Fig. 1. The scale 44 is logarithmic in character and permits a meter deflection which is substantially as large for the range from 0 to 10 fathoms, as it is from 10 to 100 fathoms. This is actually an advantage, because the navigator of a ship is naturally more concerned with accuracy of depth when the depth is shallow than when it is large. In fact the navigator wishes to know depth with an accuracy roughly inversely proportional to the actual depth, and this is provided by the circuit which I have shown.

While a certain specific embodiment has been shown and described, it will, of course, be understood that various modifications may be made without departing from the invention. Thus while I have shown a thyratron discharge tube, other types may be used instead, and my range indicating circuit may be employed with different pulse-echo systems. The appended claim is, therefore, intended to cover any such modifications within the true spirit and scope of the invention.

What I claim as new and desire to secure by Letters Patent of the United States is:

A pulse echo indicating system for providing a meter indication of the time interval between the occurrence of a first positive electrical pulse and of a second positive electrical pulse, comprising a charging circuit constituted by a capacitor connected in parallel with a resistor, and having one terminal connected to a common ground point, a diode discharge device having an anode and a cathode, said cathode being connected to the other terminal of said capacitor, said anode being connected to receive said first positive pulse, an electronic discharge device of the gaseous type, said device having an anode, a control electrode and a cathode, and being normally non-conductive, said anode being connected to the other terminal of said capacitor, said control electrode being connected to receive said second electrical pulse, said cathode being connected in series with a second capacitor to said ground point, a resistor in series with a direct current meter connected in parallel with said second capacitor, said gaseous discharge device being normally non-conducting whereby said first capacitor charges positively upon the occurrence of said first pulse to a positive voltage substantially equal to the peak value of said first pulse, said first capacitor discharging exponentially thereafter through said resistor, said electron discharge device becoming conducting upon the occurrence of said second pulse, whereby said first capacitor is discharged through said device into said second capacitor, said second capacitor having a magnitude substantially larger than that of said first capacitor whereby said second capacitor serves as an integrator to permit said meter to indicate the charge remaining upon said first capacitor at the occurrence of said second pulse, the magnitude of said second charge depending upon the time interval between the occurrence of said first and second pulses, whereby said meter serves as an indicator of said time interval.

PAUL C. GARDINER.

REFERENCES CITED

The following references are of record in the file of this patent:

UNITED STATES PATENTS

| Number | Name | Date |
| --- | --- | --- |
| 1,718,422 | Kunze | June 25, 1929 |
| 2,009,459 | Turner | July 30, 1935 |
| 2,012,837 | Tear | Aug. 27, 1935 |
| 2,131,993 | Wittkuhns | Oct. 4, 1938 |
| 2,346,093 | Tolson | Apr. 4, 1944 |